March 15, 1966 L. H. MATTHIAS ETAL 3,240,951
STATIC SWITCH FOR MULTI-SPEED ERROR DETECTOR CONTROL SYSTEM
Filed Jan. 11, 1962 2 Sheets-Sheet 2
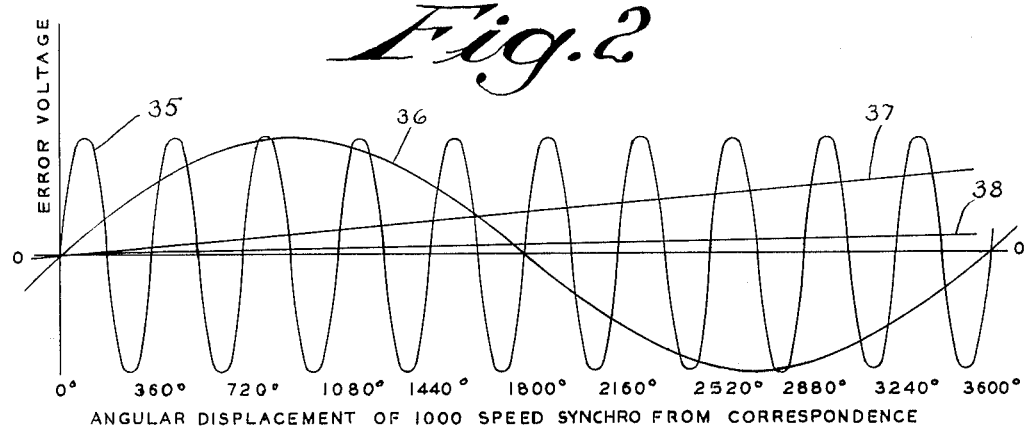
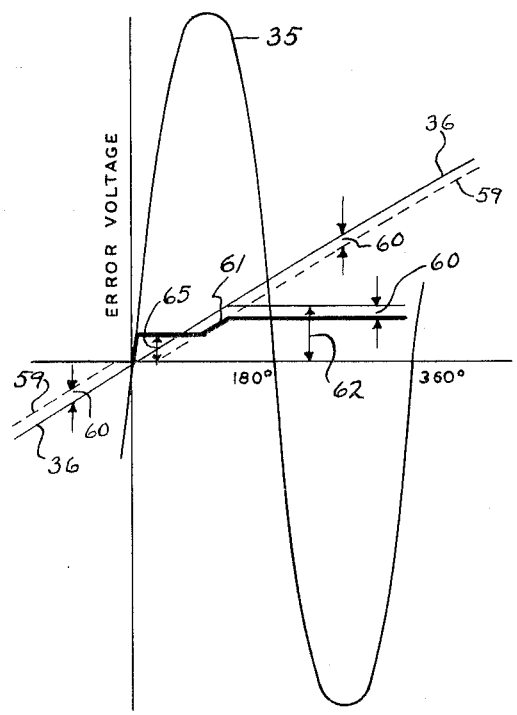
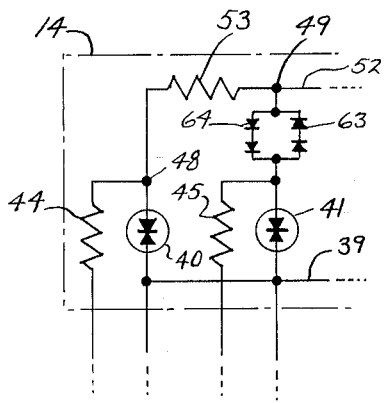
INVENTORS
LYNN H. MATTHIAS
ODO J. STRUGER
BY Thomas W. Ehrmann
ATTORNEY United States Patent Office 3,240,951
Patented Mar. 15, 1966

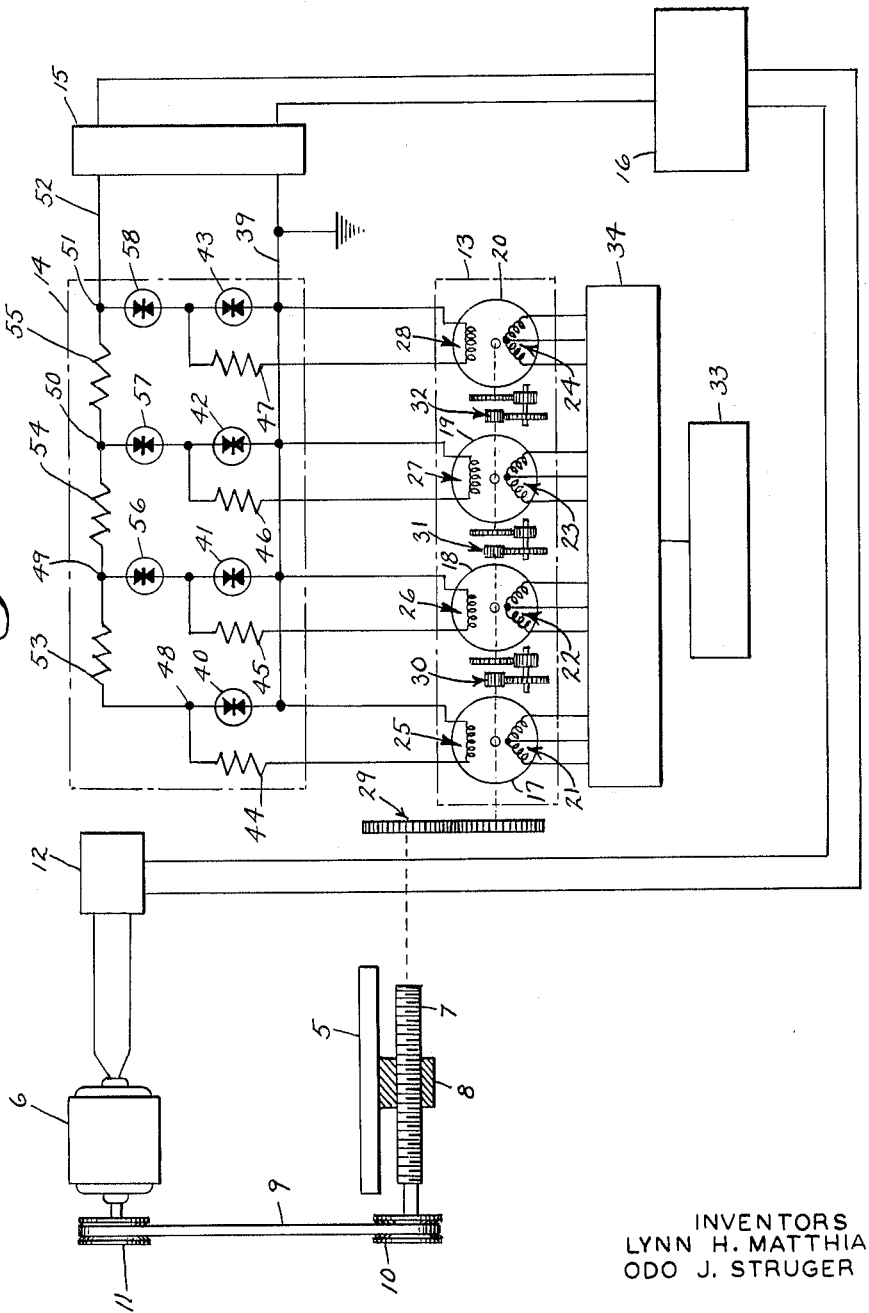

3,240,951
STATIC SWITCH FOR MULTI-SPEED ERROR
DETECTOR CONTROL SYSTEM
Lynn H. Matthias, Fox Point, and Odo J. Struger, Milwaukee, Wis., assignors to Allen-Bradley Company, Milwaukee, Wis., a corporation of Wisconsin
Filed Jan. 11, 1962, Ser. No. 165,636
4 Claims. (Cl. 307—88.5)

This invention relates to a static switch for a multi-speed error detector control system, and particularly resides in a static switch for a feedback control system adapted to position an object by reference to a preselected desired position and in which the positioning is accomplished by driving means controlled by a plurality of position error detectors having different speeds, said static switch circuit being capable of transferring the control of the driving means from one to another of the error detectors depending upon the amount of disagreement between the actual position of the object and its desider position.

Feedback control systems adapted to accurately position an object, such as a work piece to be machined, rely upon a plurality of position error detectors that give a signal indication of the difference between the actual position of the object and a preselected, desired position, such signal being employed to control driving means for positioning the object. These error detectors each have their respective zone of control, and are accordingly used successively as the object travels toward the preselected position. Error detectors may be either a direct current type, such as a potentiometer, or of an alternating current type, such as a linear or rotary induction device. The linear and rotary induction devices are generally termed synchros and are quite similar in operation, varying primarily in their construction. Since the induction devices, or synchros, are the more commonly used error detectors in machine tool control systems, the discussion herein will be directed to the use of synchros, and particularly rotary synchros, but it is to be understood that the invention is to have wide application to any form of error detector compatible with the static switch circuit of the invention.

The rotary synchros generally consist of primary and secondary windings wound about rotor and stator members for movement of one with respect to the other. A plurality of rotary syncros are mechanically coupled to the object being positioned and adjacent synchros are mechanically coupled to each other by suitable gearing so that the angular displacement of the rotor member with respect to the stator member of each synchro is in a fixed relation to the linear movement of the object.

A desired, preselected position of the object is related through a command unit to produce voltage signals which are impressed on the windings of either the stator or rotor member of each synchro. Thereafter, angular displacement of the rotor member gives rise to an error voltage in the windings of the rotor member which is, therefore, controlled by the actual position of the object. Such error voltage is employed to control the degree and direction of movement of the object by driving means, and when the error voltage is zero, the object has been brought to its preselected desired position.

A plurality of synchros are employed to obtain greater accuracy and precision in positioning of the object. The synchros are characterized as coarse, medium, fine, etc., depending upon their precision, with the synchro having the lowest geared ratio of mechanical coupling with the object constituting the coarse synchro. Since the finer synchros will make many more revolutions for a certain linear travel of the object than the coarse synchro, the plurality of synchros may also be classified according to their speed with the coarse synchro being the low speed synchro and the fine synchro being a high speed synchro.

The envelope of the maximum amplitudes of the alternating voltage output of each rotary synchro is in the form of a sinusoidal curve which exhibits two null points for each full revolution of the rotor member. Since the servo-mechanism system employs such null points to position the object, the coarse or low speed synchro must be mechanically coupled to the object or its driving means whereby linear movement of the object within the limits of control will result in rotation of the coarse synchro through less than one-half of its full cycle. Due to a lack of precision which may result from employing a single coarse synchro to finally position the object, one or more higher speed synchros are mechanically coupled to the coarse synchro with suitable gear ratios. The coarse synchro is, therefore, provided to control the driving means of the object when the difference between the actual position of the object and its desired position is relatively large. As the difference between the actual and desired positions decreases, control of the driving means is transferred from the coarse synchro through consecutively finer synchros.

It is a principal object of this invention to provide a static switch which performs the function of transferring the control of the driving means of an object from a relatively coarse error detector to a finer error detector when the positional disagreement is reduced, and for transferring the control back to the coarse error detector when the positional disagreement exceeds a preselected amount. It is also an object of this invention to accomplish the above function of transferring control by use of a circuit which incorporates only static elements and does not resort to movable contact relays.

The circuit of this invention affords accurate and efficient control by the use of non-linear conductors which may take the form of zener diodes. Non-linear conductors are employed to limit to a preselected level the error voltage output of the synchros which is transmitted to a resistive summing circuit. In addition, further non-linear conductors may be employed to prevent the entrance into the voltage summing circuit of residual and low synchro output voltages in the output of the take-over circuit. With the circuit of this invention the take-over of the control from one synchro to the adjacent synchro is gradual and no pronounced boundary exists.

The foregoing and other objects of this invention will appear in the description to follow. In the description, reference is made to the accompanying drawings which form a part hereof and in which there is shown by way of illustration a specific form in which this invention may be practiced. This form will be described in detail to enable those skilled in the art to practice this invention but it is to be understood that other embodiments of the invention may be used and that changes in the embodiment described may be made by those skilled in the art without departing from the true scope of the present invention. Consequently, the following detailed description is not to be taken in a limiting sense and the scope of the present invention is best defined by the appended claims.

In the drawings:

FIG. 1 is a schematic diagram of a control system embodying the invention,

FIG. 2 is a chart of the loci of the peaks of the voltage output of the synchros, employed in the system of FIG. 1, with respect to position plotted, positive when in phase with the source or supply voltage and negative when 180° out of phase with source or supply voltage, FIG. 3 is an enlarged portion of the chart of FIG. 2 illustrating the effect of the take-over circuit of this invention, and FIG. 4 is a diagram of a portion of the take-over circuit illustrating an alternate form of non-linear conductor.

The static switch of this invention is adapted for use in a feedback control system and has particular adaptability to a machine tool control system which utilizes feedback to establish a preselected programmed position for a work piece. As illustrated in FIG. 1, such a machine tool control system is adapted to accurately and precisely position a work table 5 to which is attached a work piece to be machined. Positioning of the table 5 is accomplished by driving means which may include a D.C. shunt type motor 6 mechanically connected to a lead screw 7 which operates in a nut 8 secured to the table 5. The mechanical connection between the motor 6 and the lead screw 7 may take the form of a belt 9 which is driven by a pulley 11 on the output shaft of the motor 6 and which drives a pulley 10 secured to the lead screw 7. The direction of drive of the motor 6, and consequently the direction of linear movement imparted to the table 5, is controlled by a motor control circuit of conventional design and illustrated diagrammatically in FIG. 1 as a motor control unit 12.

Error voltages are produced by an error detector unit 13, in a manner hereinafter described, which is mechanically coupled to the lead screw 7, and such error voltages are transmitted to a static switch circuit 14 which produces an output voltage signal which is transmitted through an amplifier 15 to a phase discriminator 16. The phase discriminator produces output signal voltages which are fed to the motor control unit 12 to control the driving of the motor 6.

The error detector unit 13 includes a plurality of error detectors in the form of rotary synchros 17, 18, 19 and 20. Each rotary synchro 17, 18, 19 and 20 has a two element primary winding 21, 22, 23 and 24, respectively, with the elements being 90° apart, and each rotary synchro also has a single element secondary winding 25, 26, 27 and 28 respectively. The two element primary winding of each rotary synchro is mounted on a stator member and the single element secondary winding is mounted on a rotor member.

The rotor member of the rotary synchro 17 is mechanically connected to the lead screw 7 through suitable gearing 29 whereby the angular displacement of the rotor member of the rotary synchro 17 relative to its stator member is in a fixed relation to the linear travel of the table 5. In the system illustrated, the ratio of the gearing 29 is such that the rotor member of the rotary synchro 17 makes one complete revolution for each 0.1 inch of travel of the table 5. In addition, successive adjacent rotary synchros are mechanically connected by gearing generally of identical ratio, as for example, 10:1. Thus, the rotor member of the rotary synchros 18 is connected to the rotor member of the rotary synchro 17 by gearing 30 whereby the rotor member of the rotary synchro 18 will make one complete revolution for each ten revolutions of the rotor member of the rotary synchro 17. Similar gearing 31 and 32 connects the rotor members of the rotary synchros 18, 19 and 20, respectively. Thus, for each revolution of the rotor member of the rotary synchro 20, the rotor members of the rotary synchros 19, 18 and 17 will make 10, 100 and 1000 revolutions, respectively. The synchros 17, 18, 19 and 20 may, therefore, be characterized as extra high speed, high speed, medium speed and low speed rotary synchros, respectively, and will be referred to hereafter as the 1000-speed, 100-speed, 10-speed and 1-speed synchros, respectively.

Since it is the purpose of the control system to accurately and precisely position the table 5, information concerning the desired, preselected position must be fed to the control system and this may be accomplished in a number of conventional manners such as by use of rotary switches, push button keyboards, or punched tape readers. Since the form of input data unit employed forms no part of this invention, the input information is illustrated schematically in FIG. 1 as being produced by a command unit 33. The input information must be translated into voltage signals which can be imposed across each element of the primary windings 21, 22, 23 and 24 of the rotary synchros. The voltages imposed across the primary windings may be produced by a digital to analog converter 34, of conventional design and well known operation, and which includes a series of transformers which may be tapped at various points at the direction of the command unit 33 to produce output voltages for representing shaft positions of the rotors, wherein the analog information is in terms of the sine and cosine of the angular shaft positions of the rotary synchros 17, 18, 19 and 20 which will yield the desired position of the table 5. The output voltages thus produced are placed across the elements of the primary windings so that when the desired position of the table 5 is reached, the error voltages induced in the secondary windings 25, 26, 27 and 28 will be zero.

A plurality of command rotary synchros which match the synchros 17, 18, 19 and 20 may be employed in place of the digital to analog converter 34. When such command synchros are employed, the command unit 33, in effect, positions the rotor windings of the command rotary synchros relative to the stator windings so that voltages are imposed in the primary windings 21, 22, 23 and 24 of the rotary synchros 17, 18, 19 and 20, respectively, which induces an error voltage in the secondary windings 25, 26, 27 and 28 respectively. Again, when the voltage induced in the secondary windings is zero, the synchros are said to be in correspondence and the preselected position of the table 5 has been reached.

The alternating error voltage induced in each of the secondary windings 25, 26, 27 and 28 varies with the position of the rotor member relative to the stator member, and the values of the maximum voltages that may be induced will attain a peak value and decrease to zero value twice in each revolution of the rotor member. For one-half revolution, the error voltage will have an in-phase relation with the supply voltage impressed across the associated primary windings 21, 22, 23 and 24, and for the other half revolution the error voltage will be in phase reversal with respect to the supply voltage. The values of maximum induced error voltages present an envelope that varies sinusoidally with rotational position. When the error voltage is in-phase with the supply voltage a plot of such in-phase error voltages is represented by a positive half cycle of a sinusoidal curve of FIG. 2, and when the error voltage is in phase reversal with the supply voltage a plot of such error voltages is represented by a negative half cycle of a sinusoidal curve of FIG. 2. In FIG. 2 the abscissa represents angular displacement in degrees of the rotor member of the 1000-speed synchro 17 and the ordinate represents the error voltage induced in the secondary windings 25, 26, 27 and 28. A sinusoidal curve 35 for the 1000-speed synchro 17 completes one cycle for each 360° rotation of the rotor member of the synchro 17. Since the rotor member of the 100-speed synchro 18 makes one complete revolution for each ten revolutions of the rotor member of the 1000-speed synchro 17 due to the gear ratio of the gearing 30, a sinusoidal curve 36 for the 100-speed synchro 18 completes one cycle for each ten cycles of the curve 35. Similarly, each cycle of a sinusoidal curve 37 for the 10-speed synchro 19 encompasses ten cycles of the curve 36, and a sinusoidal curve 38 for the 1-speed synchro 20 completes one cycle for every ten cycles of the curve 37. Complete cycles of the sinusoidal curves 37 and 38 are not shown because of the abscissa scale employed.

From FIG. 2 it can be seen that if the positional disagreement is substantial, that is if the rotor member of the 1000-speed synchro 17 would require more than 180° of rotation before the table 5 would reach the preselected desired position, the 1000-speed synchro 17 could not be employed to control the motor 6 since the envelope of the error voltage output of the 1000-speed synchro 17 would follow the curve 35 to a zero value at a point 360° away from the desired position of the rotor member of the synchro 17 and would, therefore, result in a false position. The point 360° away from the desired position of the rotor member of the 1000-speed synchro 17 would be reached by the action of the discriminator 15. The discriminator 15, when supplied with an error voltage which falls in the negative half cycle of the curve 35 will cause the motor 6 to drive in one direction, and when supplied with an error voltage which falls in the positive half cycle of the curve 35 will cause the motor 6 to drive in an opposite direction. Therefore, each rotary synchro has its individual zone of control which is equal to one-half cycle of its respective sinusoidal curve, and control of the motor 6 must be transferred from one synchro to the adjacent synchro before the end of the zone of control is reached. For example, control of the motor 6 must be transferred from the 100-speed synchro 18 to the 1000-speed synchro 17 only after the angular displacement of the 1000-speed synchro 17 is less than 180°, and preferably the control is transferred when the angular displacement is about 90° to guarantee a safe operation of the system.

In the system being described, the rotor member of the 1000-speed synchro 17 makes one complete revolution for each 0.1 inch linear travel of the table 5 and the rotor member of the 1-speed synchro 20 will make one complete revolution for each 100 inches of linear travel of the table 5. Since the sinusoidal curve 38 exhibits two null points, or points of zero error voltage, for each complete revolution of the rotor member of the 1-speed synchro 20, and to avoid ambiguity due to the phase reversal of the maximum amplitude of the induced error voltage, only one desired position point may exist within the limit of movement of the table 5. Thus, the zone of control of the 1-speed synchro 20 is limited to one-half cycle of the sinusoidal curve 38, which corresponds to a 50 inch linear movement of the table 5, and this is the limit of table movement which may be controlled. Similarly, the effective zone of control for the remaining synchros 17, 18 and 19 is equal to the half cycle of their sinusoidal curves 35, 36 and 37, respectively, or 0.05 inch, 0.5 inch and 5 inches, respectively. Thus, the 1-speed synchro 20 is employed when the positional disagreement exceeds 5 inches and consecutively higher speed synchros are employed as the positional disagreement decreases. The rotary synchros 17, 18, 19 and 20 may also be classified according to the precision of control which they exercise, that is, as extra fine, fine, medium and coarse synchros, respectively.

One lead of each of the secondary windings 25, 26, 27 and 28 is connected in common to form one output lead 39 of the static switch 14. Limiting non-linear conductors preferably in the form of double anode or symmetrical zener diodes 40, 41, 42 and 43 are connected to the common connecting leads of the windings 25, 26, 27 and 28 respectively. Protecting resistors 44, 45, 46 and 47 are connected to the non-common leads of the secondary windings 25, 26, 27 and 28, respectively, and are connected in series with the double anode zener diodes 40, 41, 42 and 43, respectively. Thus, an error voltage controlling circuit which includes a resistor and a non-linear conductor in series is provided across the leads of each rotary synchro. The voltage controlling circuits for the rotary synchros 17, 18, 19 and 20 are each connected between the resistors and limiting non-linear conductors to a resistive summing circuit at junction points 48, 49, 50 and 51, respectively. The summing circuit forms a second output lead 52 of the static switch 14 and includes three resistors 53, 54 and 55 in series so that a resistor is placed between each successive pair of junction points (see FIG. 1). Blocking non-linear conductors which may also take the form of double anode or symmetrical zener diodes 56, 57 and 58 are placed in the connections of the controlling circuits of the rotary synchros 18, 19 and 20, respectively, to the summing circuit. It is to be noted that such a blocking non-linear conductor does not appear in the connection from the controlling circuit for the 1000-speed synchro 17.

Zener diodes are a form of non-linear conductor which exhibit not only a voltage drop in their forward direction but also exhibit the characteristic of breakdown in their reverse direction when the voltage exceeds a certain level, the value of which is termed the breakdown voltage. A double anode or symmetrical zener diode may be considered to be two single anode zener diodes so connected that there is a symmetrical breakdown in both directions. When an A.C. source is used for the control system, it is necessary to provide for breakdown in both directions.

To facilitate an understanding of the general operation of the static switch circuit 14, let it be assumed that the table 5 is moved a slight distance from its desired position. Such movement will cause the rotor members of the rotary synchros 17, 18, 19 and 20 to rotate out of correspondence and error voltages will be induced in the secondary windings 25, 26, 27 and 28, respectively. If the movement of the table 5 is very small, the rotor member of the 1000-speed synchro 17 will be displaced angularly only to a limited degree and the angular displacement of the rotor members of the remaining synchros 18, 19 and 20 will be successively less by a ratio of 10:1, the gear ratio. Also, the error voltage which has been induced in the windings 25 of the 1000-speed synchro will be about ten times greater than the error voltage induced in the windings 26 of the 100-speed synchro 18, about one hundred times greater than that of the 10-speed synchro 19, and about one thousand times greater than that of the 1-speed synchro 20. If the error voltage induced in the windings 25 of the 1000-speed synchro 17 is less than the breakdown voltage of the limiting double anode zener diode 40, such voltage will be fed to the resistive summing circuit comprised of the resistors 53, 54 and 55 in series. At the same time, the error voltages of the remaining rotary synchros are very small and the blocking zener diodes 56, 57 and 58 prevent the entrance of the residual and low voltages to the summing circuit. Therefore, the error voltage of the 1000-speed synchro 17 will control the output of the static switch circuit 14.

When the voltage induced in the winding 25 of the 1000-speed synchro 17 increases, due to increasing positional disagreement, to a level where it exceeds the breakdown voltage of the double anode zener diode 40, the alternating error voltage fed to the summing circuit will be symmetrically clipped to the level of the breakdown voltage and cannot thereafter exceed such amount. Therefore, while the error voltage of the 1000-speed synchro continues to control the output of the static switch circuit 14, the error voltage fed to the summing circuit by the 1000-speed synchro 17 is limited. As the error voltage induced in the windings 25 of the 1000-speed synchro 17 continues to increase, the corresponding error voltage induced in the windings 26 of the 100-speed synchro 18 will increase to a point where the voltage fed to the summing circuit will be larger than that supplied by the controlling circuit of the 1000-speed synchro 17 and, therefore, the 100-speed synchro will control the output of the static switch circuit 14. The alternating error voltage fed to the summing circuit by the voltage controlling circuit for the 100-speed synchro 18 will again be limited by the breakdown voltage of the limiting double anode zener diode 41, but control of the output of the static switch circuit 14 will continue to be exercised by the 100-speed synchro 18 until the voltage fed to the summing circuit by the controlling circuit for the 10-speed synchro 19 becomes dominant. In a similar manner, control of the output voltage of the static switch circuit 14 is transferred to the 1-speed synchro 20 when the positional disagreement is large.

Further understanding of the operation of the take-over circuit 14 may be had by reference to FIG. 3. In FIG. 3, a portion of the chart of FIG. 2 is shown to a larger scale. Specifically, only that portion of FIG. 2 within one cycle of the sinusoidal curve 35 for the 1000-speed synchro 17 is shown. The corresponding portions of the curves 37 and 38 have been omitted for clarity.

The blocking double anode zener diode 56 has the effect of decreasing the maximum amplitude of error voltage of the 100-speed synchro 18 by an amount about equal to its breakdown voltage. An adjusted sinusoidal curve, with a pronounced dead zone, represented by the dotted line 59 results, which curve 59 is displaced a distance 60 from the curve 36. The distance 60 is equal to the sum of the breakdown voltage and the forward direction voltage drop of the double anode zener diode 56. It will be noted that the resulting curve 59 has a null zone or region of zero error voltage which encompasses the point of correspondence, which is the point where zero error voltage is induced in the secondary winding 25 of the 1000-speed synchro 17. The purpose of providing such a null zone is to prevent a false point of correspondence which may result from the lack of precision of the digital to analog converter. For example, if it is desired to move the machine tool table 5 to a position of 29.325 inches from the reference, the 1-speed synchro 20 receives a set of input voltages equivalent to 29.300 inches, the 10-speed synchro 19 receives a set of input voltages equivalent to 9.320 inches, the 100-speed synchro 18 receives a set of voltages equivalent to 0.325, and the 1000-speed synchro 17 receives a set of voltages equivalent to 0.025 inch. Thus, it is obvious that the zero transition, equivalent to zero induced error voltage, is not the same for all synchros. Rather, at the desired position point there exists some output voltages of the lower speed synchros consisting of the error voltage due to positional disagreement and additional noise voltage due to non-linearity of the synchro's magnetic characteristics. Therefore, the null zone is created to prevent transfer of the control of the driving means back to the 100-speed synchro 18 which would lead to an erroneous point of correspondence. Similar null zones are created by the blocking double anode zener diodes 57 and 58 for the error voltage curves 37 and 38. It should be noted that a blocking non-linear conductor is not used for the 1000-speed synchro 17 since this is the final positioning control and it is necessary that the curve 35 for the 1000-speed synchro pass sharply through zero to obtain high resolution for positioning about the desired point.

In FIG. 3, the heavy line 61 represents a portion of the envelope of the maximum amplitudes of the error voltage at the junction point 49. It will be noted from viewing the line 61 that at error voltage outputs less than the breakdown voltage of the double anode zener diode 40, the envelope of the error voltage at the junction point 49 will approximately follow the sinusoidal curve 35 for the 1000-speed synchro 17. As the positional disagreement increases, the breakdown voltage of the double anode zener diode 40 is exceeded and the voltage fed to the junction point 49 is thereby clipped to a constant level represented by the distance 65 which is equal to the breakdown voltage plus the forward voltage drop of the limiting double anode zener diode 40 and less the voltage drop across the resistor 53. The 1000-speed synchro 17 continues to control the error voltage at the junction point 49 until the error voltage fed to the junction 49 from the controlling circuit for the 100-speed synchro 18 exceeds the voltage 65. Thereafter, the envelope of the error voltage of the junction point 49 increases according to the adjusted error voltage curve 59 until the breakdown voltage of the limiting double anode zener diode 41 is exceeded. Then, the envelope of the error voltage at the junction point 49 will be clipped to a level equal to the breakdown voltage of the double anode zener diode 41, represented by the distance 62, less the breakdown voltage of the blocking double anode zener diode 56, represented by the distance 60. The error voltage at the junction point 49 is reflected in the output voltage of the static switch circuit 14. In a similar manner the output voltage of the static switch circuit 14 is controlled by the error voltages of the 10-speed synchro 19 and the 1-speed synchro 20 as the positional disagreement increases.

It will be noted that the take-over of the 100-speed synchro 18 is affected at approximately 90° of angular displacement of the 1000-speed synchro 17. While the switching may be accomplished at any point within the half cycle, it is desirable to accomplish the same at 90° since this provides for the greatest safety margin.

While the invention is not limited thereto, satisfactory results may be achieved if the limiting double anode zener diodes 40, 41, 42 and 43 employed have breakdown voltages which vary from 8 percent to 14 percent of the synchros' maximum output voltages and if the blocking double anode zener diodes 56, 57 and 58 employed have breakdown voltages equal to 3 percent of the synchros' maximum output voltages.

By the operation of the static switch circuit 14, with increasing positional disagreement, there will be produced at the output terminals 39 and 52 an alternating error voltage which is fed through the amplifier 15 to the discriminator 16. The discriminator 16 determines the phase of the error voltage and produces a direct voltage having a polarity which corresponds to the direction of error. The amplifier 15 and discriminator 16 may be of conventional design and form no part of the present invention.

It is not necessary to provide a limiting double anode zener diode 43 in the controlling circuit for the 1-speed synchro 20 since there is no lower speed synchro which must take over control of the motor 6 and, therefore, it is not necessary to clip the output of the 1-speed synchro 20. However, the amplifier 15 will normally saturate below the maximum amplitude of the error voltage and, therefore, it is desirable to limit the error voltage output of the 1-speed synchro 20 by a limiting double anode zener diode 43.

Alternate forms of non-linear conductors may be employed in the static switch circuit 14 in place of the double anode zener diodes hereinbefore described. It is obvious that two single anode zener diodes could be employed in series opposing each other to produce the desired breakdown voltage in both directions. Also, simple diodes may be employed in place of zener diodes. Referring to FIG. 4, the blocking double anode zener diode 56 has been replaced by two pairs of diodes 63 and 64 which are connected in parallel. The diodes 63 are connected in series so that their forward voltage drop is in the same direction. The diodes 64 are also connected in series so that their forward voltage drop is in the same direction and opposite to the direction of forward voltage drop of the diodes 63. This arrangement of diodes will result in a voltage drop in both directions. Such an arrangement of simple diodes may be employed in place of the remaining double anode zener diodes as well.

While the employment and operation of the static switch circuit 14 of this invention has been shown and described as acting upon rotary synchros, it is to be understood that the static switch circuit has equal application to control systems which utilize other forms of error detectors including linear induction devices and potentiometers. A control system which employs potentiometers as the error detectors does not require a discriminator and an alternate input data means must be employed. However, the only change necessary to the static switch circuit from that described would be the use of single anode diodes rather than double anode diodes.

We claim:
1. In a control system having means for producing a plurality of cyclically variable signal voltages, a first of said plurality of signal voltages having a relatively high rate of change relative to change in a quantity being controlled and the others of said signal voltages having successively lesser rates of change, the combination therewith of a static switch circuit comprising: a first output lead and a second output lead; a summing circuit connected to said first output lead and having a plurality of summing resistors connected together in series at junction points; a plurality of pairs of input leads each having one input lead connected to said second output lead, a first of said pairs of input leads being connected to receive said first signal voltage and the others of said pairs of input leads each being connected to receive one of said other signal voltages, the other input lead of said first pair of input leads being connected to the other end of said summing circuit; a voltage limiting non-linear conductor having a predetermined breakdown voltage connected in series with a resistor across each of said pairs of input leads for shunting from the output leads signal voltages in excess of said predetermined breakdown voltage; and a low voltage blocking non-linear conductor connected in series with the resistor between the other input lead of each of said other pairs of input leads and a successive junction point in said summing circuit, said low voltage blocking non-linear conductor having a lower predetermined breakdown voltage than said breakdown voltage of the limiting non-linear conductor for blocking from the output leads signal voltages less than said breakdown voltage of said blocking non-linear conductor.

2. A static switch circuit in accordance with claim 1 wherein said voltage limiting non-linear conductors and said blocking non-linear conductors are zener diodes.

3. In a control system having means for producing a plurality of cyclically variable signal voltages, a first of said plurality of signal voltages having a relatively high rate of change relative to change in a quantity being controlled and the others of said signal voltages having successively lesser rates of change, the combination therewith of a static switch circuit comprising: a first output lead and a second output lead; a summing circuit connected to said first output lead and having a plurality of summing resistors connected together in series at junction points; a plurality of pairs of input leads each having one input lead connected to said second output lead, a first of said pairs of input leads being connected to receive said first signal voltage and the others of said pairs of input leads each being connected to receive one of said other signal voltages; a voltage controlling circuit including a voltage limiting non-linear conductor having a predetermined breakdown voltage and a resistor connected in series across each pair of input leads for shunting from the output leads signal voltages in excess of said predetermined breakdown voltage, the other end of said summing circuit being connected to the voltage controlling circuit for said first pair of input leads between the resistor and voltage limiting non-linear conductor thereof; connections joining said controlling circuits for said other pairs of input leads between the resistors and voltage limiting non-linear conductors thereof to successive adjacent junction points in said summing circuit; and a low voltage blocking non-linear conductor disposed in each of said connections joining the controlling circuits and said summing circuits, said low voltage blocking non-linear conductor having a lower predetermined breakdown voltage than said breakdown voltage of said voltage limiting non-linear conductor for blocking from the output leads signal voltages less the said breakdown voltage of said blocking non-linear conductor.

4. In a control system having means for producing a plurality of cyclically variable signal voltages, a first of said plurality of signal voltages having a relatively high rate of change relative to change in a quantity being controlled and the others of said signal voltages having successively lesser rates of change, the combination therewith of a static switch circuit comprising: a first output lead and a second output lead; a summing circuit connected at one end to said first output lead and having a plurality of summing resistors connected together in series at junction points; a plurality of pairs of input leads each having one input lead connected to said second output lead, a first of said pairs of input leads being connected to receive said first signal voltage and the others of said pairs of input leads each being connected to receive one of said other signal voltages, the other input lead of said first pair of input leads being connected to the other end of said summing circuit; a voltage limiting non-linear conductor having a predetermined breakdown voltage connected in series with a resistor across each of said pairs of input leads for shunting from the output leads signal voltages in excess of said predetermined breakdown voltage; and a blocking non-linear conductor having a predetermined breakdown voltage connected in series with the resistor between the other input lead of each of said other pairs of input leads and a successive junction point in said summing circuit for blocking from the output leads signal voltages less than said predetermined breakdown voltage of said blocking non-linear conductor.

References Cited by the Examiner

UNITED STATES PATENTS

| 2,752,489 | 6/1956 | Aigrain | 328—146 |
| 2,783,453 | 2/1957 | Rose | 328—146 |
| 2,848,670 | 4/1958 | Kelling et al. | 307—88.5 |
| 3,014,211 | 12/1961 | Beessey | 307—88.5 |
| 3,031,142 | 4/1962 | Cohen et al. | 307—88.5 |

OTHER REFERENCES

Shaughnessy: "Popular Electronics," The Zener Diode, June 1961, pages 76–82.

ARTHUR GAUSS, *Primary Examiner.*